May 21, 1968     H. J. MALACHOWSKI     3,384,334
MIRROR SUPPORT
Filed Jan. 20, 1966     3 Sheets-Sheet 1
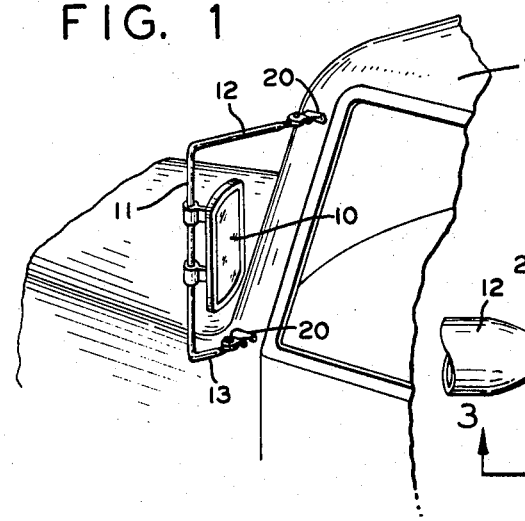
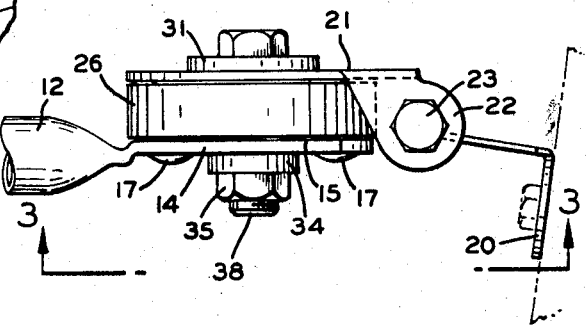
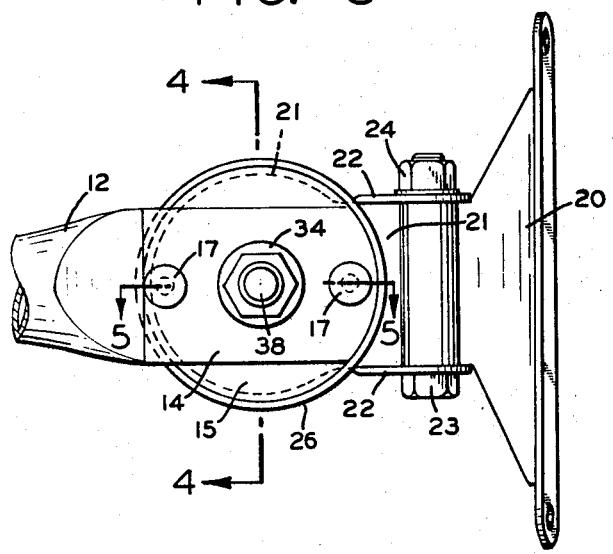
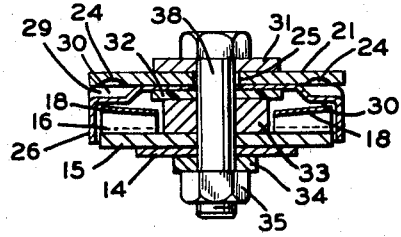
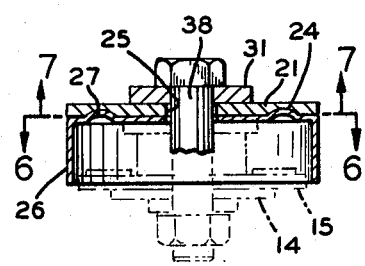
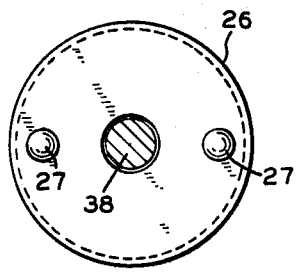
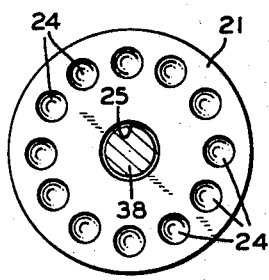
INVENTOR.
H. J. Malachowski,
BY
J. H. Golden
ATTORNEY.

May 21, 1968  H. J. MALACHOWSKI  3,384,334
MIRROR SUPPORT
Filed Jan. 20, 1966  3 Sheets-Sheet 2
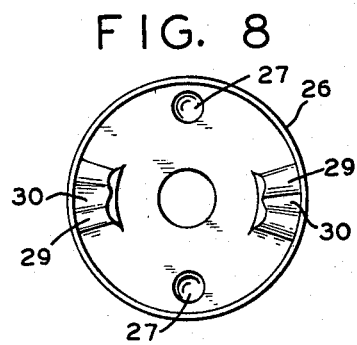
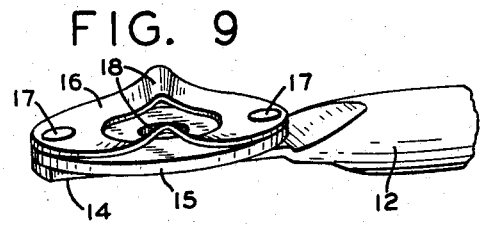
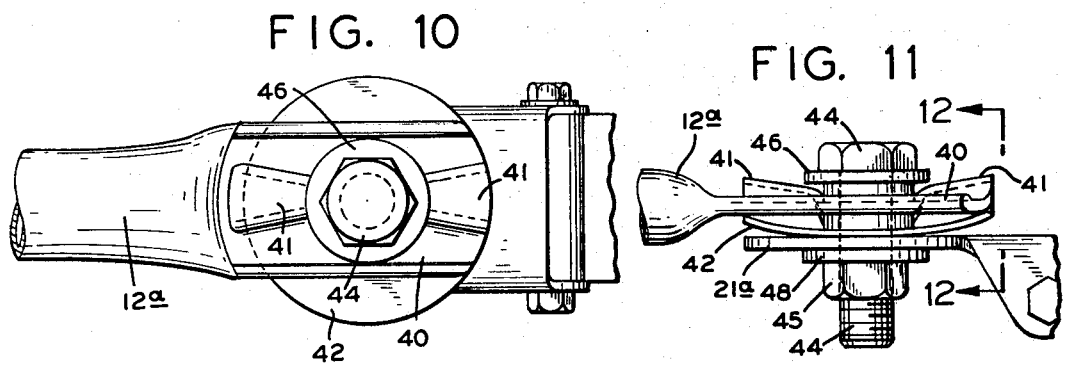
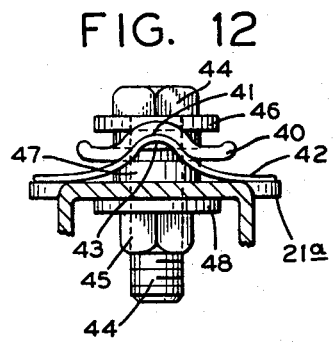
INVENTOR.
H. J. Malachowski
BY
ATTORNEY.

May 21, 1968   H. J. MALACHOWSKI   3,384,334
MIRROR SUPPORT
Filed Jan. 20, 1966   3 Sheets-Sheet 3
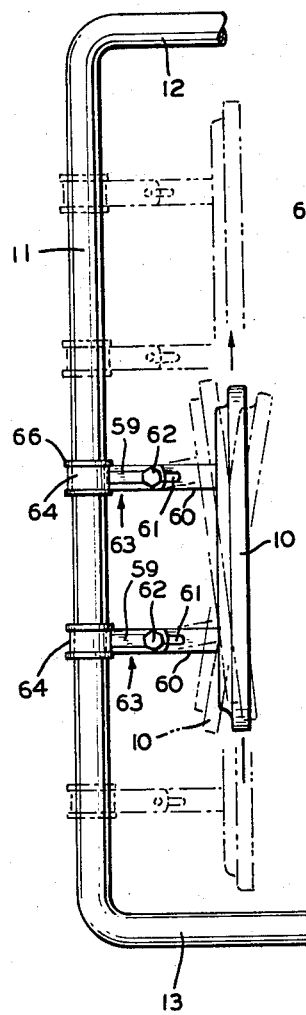
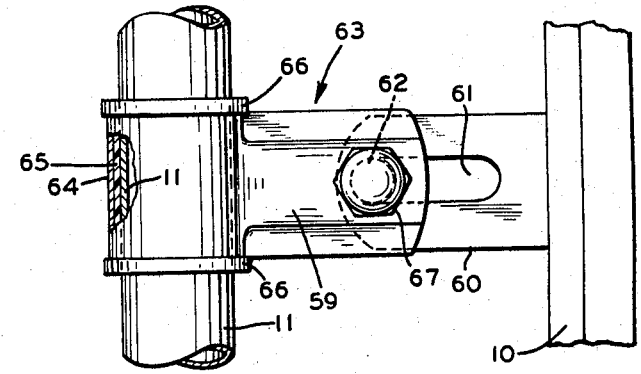
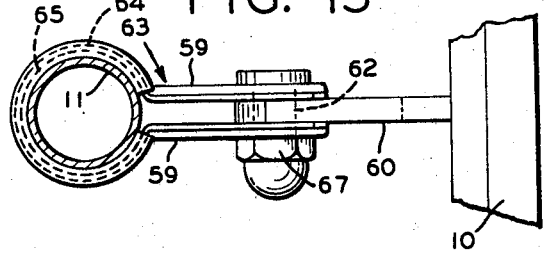
INVENTOR.
H. J. Malachowski
BY
A. H. Golden
ATTORNEY.

3,384,334
MIRROR SUPPORT
Handry J. Malachowski, Wilton, Conn., assignor to Yankee Metal Products Corp., Norwalk, Conn., a corporation of New York
Filed Jan. 20, 1966, Ser. No. 521,908
4 Claims. (Cl. 248—478)

ABSTRACT OF THE DISCLOSURE

An adjustable mirror support for an automobile comprising two hinge members mounted for rotation about a shaft with means on the shaft holding said members in the same fixed spaced relation in all rotated positions, together with detent means on each of said members coacting for yieldingly holding said members in a predetermined rotated position.

---

This invention relates to the mounting of a mirror relatively to a truck. As those skilled in the art understand, there are many patents illustrating mechanisms for securing mirrors in spaced relation to a truck body so that the operator of the truck may better manipulate the truck in parking and in traffic. It is particularly important that the mirror be so mounted that it may be manipulated readily on occasion so as not to obstruct the movement of the truck in a narrow passageway or relatively to other vehicles, and that it then be readily returned to its usual position. Also, the mirror should be fully adjustable both relatively to the truck and relatively to the operator. It is also particularly important that the mechanism be extremely rigid to hold the mirror against vibration.

As a feature of my invention, I contribute a mounting member that is adapted to mount a mirror, and to move bodily with the mirror relatively to the means that support the mounting member on the truck body. As a particular feature of the invention, I contribute pivotal support means for the mirror mounting member adapted to hold the mounting member yieldingly and rigidly in a particular adjusted pivoted position relatively to the truck. It is a feature of this part of the invention that the pivotal support means hold the mirror mounting member in a single plane during its pivoting movement, whereby to lend rigidity thereto in all positions thereof.

As a still further feature of the pivotal support means, they are enclosed against the weather, and make possible the effective lubrication and protection of the particular detent means used to hold the mounting member yieldingly in its adjusted pivoted position.

It is a further feature of the invention that detent means are utilized for holding the mirror mounting member in its adjusted pivoted position and comprise a spring device secured to one of two relatively moving parts of the pivotal mounting. Thus, the detent spring device may be secured to the mirror mounting member for bodily rotation integrally therewith, and in a particular predetermined plane from which it does not move bodily during the pivotal movement. The flexing of the spring effects the holding action that is required. As will be made apparent in the description that follows, the mounting of the parts for movement each in a particular plane, and for cooperation in that plane, makes possible the extremely stable pivoting of the mirror mounting member so that it will not vibrate and will hold the mirror effectively in all positions of adjustment.

As a further feature of the invention, I make possible the adjustment of the position in which the mounting member will normally be held relatively to the truck and from which position it may be moved if the truck must enter a narrow passageway.

In a modified form of the invention, the mirror mounting member rotates, as in the first modification, in a particular predetermined plane relatively to the support means to which it is pivoted. Again, a detent which is preferably in the form of a spring washer, will effectively hold the mounting member in a particular predetermined position from which it may be moved forcefully whenever such movement is necessary.

As a still further feature of the invention, I utilize a novel means for securing the mirror to the mounting member. Thus, the securing means are so formed that the mirror may move toward and away from the mounting member while at the same time assuming a position parallel to the mounting member or angular to the mounting member. More particularly, the mirror may move bodily toward and away from the tube which preferably forms the mounting member while moving also into a tilted position relatively to the mounting member.

As a still further feature of the invention, the securing means for the mirror may move upwardly or downwardly on the mounting member. As a still further feature of the invention, fastening means are provided for securing the mirror in an adjusted position, the same fastening means being utilized for securing the mirror in a tilted position, an in and out position, and also in a particular up and down position relatively to the mounting member.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawings, FIGURE 1 illustrates the position in which the mounting of my invention holds the rear view mirror relatively to a truck;

FIGURE 2 is an elevation of the pivotal support means for the mirror mounting member;

FIGURE 3 is a view looking upwardly at the pivotal support means of FIGURE 2 along the line 3—3 of FIGURE 2;

FIGURE 4 is a view taken along line 4—4 of FIGURE 3;

FIGURE 5 is a view taken along line 5—5 of FIGURE 3, illustrating the means for adjusting the position of the cup forming the protective means for the pivotal support of my invention;

FIGURES 6 and 7 are views taken along lines 6—6 and 7—7 respectively of FIGURE 5;

FIGURE 8 is a view looking inwardly and downwardly into the cup shown in FIGURE 5;

FIGURE 9 is a perspective view of the plate portion of the arm of the mounting member and illustrates the spring detent washer secured thereto;

FIGURE 10 is a view looking downwardly on a modification of my invention;

FIGURE 11 is an elevational view of the parts of FIGURE 10;

FIGURE 12 is a view taken along line 12—12 of FIGURE 11;

FIGURE 13 is an enlarged view of the adjustable securing means for the mirror;

FIGURE 14 is an enlarged view of certain parts of FIGURE 13; and

FIGURE 15 is a partial section taken along line 15—15 of FIGURE 13.

Referring now more particularly to the drawings, the mirror of my invention is designated by reference numeral 10 and is suitably supported relatively to a bracket 11 by means that will be described hereinafter and which form part of my invention. For the present, it is merely necessary to appreciate that the bracket 11 is tubular in form and has an upper extension or arm 12 and a lower extension or arm 13. Each of the arms 12 and 13 is adapted to be pivoted relatively to the body of the truck T, and to be held yieldingly in a particular pivoted position by means constituting my invention, and which are well illustrated in FIGURES 2 to 9 inclusive. Since the pivoting means are the same for the arms 12 and 13, only the upper securing means used in connection with arm 12 will be described.

Arm 12 is deformed at its end to form a flat portion 14 and to this flat portion 14, as best seen in FIGURE 9, there is riveted a circular plate 15 and a spring washer 16. For this purpose, I employ a pair of rivets 17. It will be noted that the spring washer 16 has a pair of upstanding cam-shaped detent portions 18, the function of which will appear presently.

Secured to the body of the truck is a bracket 20, to which is pivoted a plate 21 by means of ears 22 and a bolt 23, all as best seen in FIGURES 2 and 3. Through a suitable nut 24, the bolt may be tightened to hold the plate 21 in an adjusted position relatively to the bracket 20. The plate 21, as best seen in FIGURES 5 and 7, is formed with a series of shallow dwells 24 and a central opening 25. A cup 26, as best shown in FIGURES 5, 6 and 8, rests against the plate 21 and is formed with a pair of outwardly pressed abutments 27 adapted to fit in the dwells 24. The purpose of this construction is to allow rotation of the cup 26 relatively to the plate 21 to an adjusted position for the purpose that will appear presently.

Cup 26 is itself in the form of a detent member adapted to cooperate with the detent portions 18 of the washer 16. For this purpose, as is best seen in FIGURES 4 and 8, cup 26 has a pair of detent portions 29 having each a detent groove 30, it being naturally the function of the detent grooves 30 to coact with the detent portions 18 of the washer 16 for yieldingly locking the arm 12 of bracket 10 in a particular pivoted adjusted position relatively to the plate 21 and the bracket 20.

I shall now describe just how I assemble the various parts of my invention in order to bring about their effective cooperation. The plate 15 secured to the arm 12 is, together with its washer 16, applied to the open end of the cup 26, this cup 26 being first placed in a particular adjusted position relatively to the plate 21. A suitable bolt, well shown in FIGURES 2 to 5 inclusive, and designated by reference numeral 38, is utilized, in cooperation with a washer 31, a further washer 32, a spacer 33 and a still further washer 34, to hold the two plates 15 and 21 in assembled relation. In this assembled relation, which is well illustrated in FIGURE 4, it is obvious that the two plates 15 and 21 will be held by the nut 35 applied to the end of the bolt 38, against any movement away from one another in an axial direction relatively to the bolt 38. Further, through the utilization of the spacer 33 as well as the washer 32, it will be apparent that the two plates 15 and 21 cannot move toward one another. At this point, it would be well to emphasize that the washers and spacers utilized may be formed of self-lubricating material, where necessary, in order to minimize friction.

It will now be apparent that when the arm 12 together with its portion 14 are rotated in the axis of the bolt 38, the detent spring washer 16 will also be rotated. At the same time, the cup 26 together with its detent portions 29, will remain fixed relatively to the body of the truck. The spring detent washer 16 will flex appropriately until the detent portions 18 thereof move into the detent grooves 30 of the upstanding portions 29 of the cup 26. When this occurs, the bracket 11 will be locked yieldingly in a particular adjusted position such as illustrated in FIGURE 1. Of course, through the exercise of necessary force, the truck operator may rotate the bracket 11 against the yielding pressure of the detent portions 18 so as to bring the mirror toward the truck in the event the truck must be maneuvered in a particular narrow isle or between other vehicles. He can thereafter rotate it back to the position of FIGURE 1.

It will, of course, be obvious that the bracket position may be adjusted away from that of FIGURE 1 simply by moving the cup 26 relatively to the plate 21. This can be accomplished by loosening nut 35 relatively to bolt 38, as can be readily determined from FIGURE 4, whereupon cup 26 is freed for rotation to bring the portions 27 out of a particular pair of dwells 24 into another pair of dwells 24.

It will, of course, be further appreciated that lubricating material may be inserted into the cup 26 and that the cup will shield the entire assembly therein contained against weather, and particularly against the entry of water.

In FIGURE 10, I illustrate a modified form of the invention in which no cup is utilized. Instead, the arm 12a, which is the equivalent of arm 12, is crimped at its end to form a portion 40, the shape of which is well seen in FIGURES 10, 11 and 12. This portion 40 has two inverted cam-shaped recesses 41 which cooperate with a spring washer 42 secured to the plate 21a, this plate being the equivalent of plate 21 of the first modification. It is rather obvious that the upstanding detent portions 43 of spring washer 42 will interlock with the recesses 41 for securing the arm 12a in a particular adjusted pivoted position relatively to the plate 21a.

While the modification of FIGURES 10–12 differs rather considerably from that of the first modification of my invention, it does have in common therewith the feature that no vertical movement can take place between the arm 12a and its crimped portion 40 on the one hand, and the plate 21a on the other hand. Thus, a bolt 44, on which is threaded a nut 45, is adapted through a suitable washer 46, a spacer 47 and a further washer 48, to hold the arm 12 and its portion 40 against movement away from or movement towards plate 21a. For this reason, effective interlocking action takes place between the portions 41 and 43 for yieldingly locking the arm 12a in a particular pivoted position relatively to the truck. At the same time, it is possible, as in the earlier modification, to move the mirror forcefully through the yielding action of the spring washer 42 and its detent portions 43.

At all times in both modifications, the mirror mounting bracket 11 moves in a single plane and holds the mirror rigidly.

Referring now to FIGURES 13 to 15, I show a portion of the invention utilized for adjusting the mirror 10 relatively to the tubular bracket 11. For this purpose, the mirror 10 has extending therefrom a pair of vertically spaced mounting elements 60, each of which is formed with a slot 61 adapted for coaction with a bolt 62. The bolt 62 traverses bores in the legs 59 of a spring-like securing element 63 which is generally U-shaped, and has an integral substantially circular portion 64 adapted to encompass the tubular bracket 11. Between the circular portion 64 and the bracket 11, there is placed, as is well shown in FIGURES 13 to 15, a split sleeve 65, preferably formed of some plastic material such as nylon, and shouldered at 66 to embrace the circular portion 64. Until the legs 59 are drawn together as hereinafter described, each securing element 63 will slide with its nylon split sleeve 65 relatively to the bracket 11 and it is possible, therefore, to bring about a vertical adjustment of the mirror 10.

However, by turning a nut 67 mounted on each of the bolts 62, it is possible simultaneously to secure each of the mounting elements 60 in a particular adjusted position relatively to each of the securing elements 63. At the same time, the legs 59 of the securing elements 63 are drawn together so as to bring pressure against the split nylon sleeves 65 to secure the elements 63 in a vertically adjusted position on the tubular bracket 11. As well shown in FIGURE 13, the mirror 10 may, through suitable adjustment, assume the several angular and vertical positions illustrated in phantom. Therefore, through the very ingenious means of my invention, the mirror is readily adjustable vertically; it is also adjustable angularly and horizontally in a vertical plane, and is further adjustable by rotation on the axis of the tubular bracket 11. I believe that those skilled in the art will now appreciate the considerable contribution of my invention.

I now claim:

1. In a combination of the class described, a mirror, a hinge for said mirror comprising a relatively fixed hinge member and a relatively rotating hinge member, means mounting said hinge members in predetermined spaced relation for rotation in said relation about a hinge axis relatively to one another, said means including rigid means for holding said members in the said predetermined spaced relation in all rotated positions thereof to contribute hinge action, detent mechanism comprising a substantially circular device secured to one of said members with its center in said hinge axis and having at least two relatively non-yielding detent means integral therewith with said non-yielding detent means spaced 180° apart relatively to said hinge axis when there are two non-yielding detent means, a second substantially circular device secured to the other hinge member and having at least two yielding detent means integral therewith and similarly spaced apart relatively to said hinge axis, said yielding detent means yieldingly engaging said relatively non-yielding detent means after relative rotation of said members in said axis for yieldingly thereafter holding said members in a predetermined rotated position.

2. In the combination of claim 1, the feature that said means mounting said hinge members for said relative rotation include a shaft, and means mounted relatively to said shaft for holding said members at all times in parallel planes during relative rotation in said parallel planes and against the force of said yielding means.

3. In the combination of claim 1, the feature that the upper of said members includes a plate and a cup having a base fitted against said plate and held against rotation relatively to said plate by a series of adjustable engaging means.

4. In the combination of claim 1, the feature that the upper of said members includes a cup which, when said members are in hinge position, has a downwardly extending flange covering the space between said members to protect the hinge and said detent means.

References Cited

UNITED STATES PATENTS

| | | | |
|---|---|---|---|
| 784,104 | 3/1905 | Caley. | |
| 1,921,310 | 8/1933 | Crisman | 248—285 |
| 2,430,606 | 11/1947 | Franz. | |
| 3,119,591 | 1/1964 | Malecki | 248—282 |
| 3,306,565 | 2/1967 | Beach | 248—282 |
| 2,424,222 | 7/1947 | Brown et al. | 248—278 |
| 2,960,717 | 11/1960 | Moore. | |
| 3,107,077 | 10/1963 | Lassa | 248—478 |

FOREIGN PATENTS 879,336, 10/1961 Great Britain.

ROY D. FRAZIER, *Primary Examiner.*